United States Patent
Kirke et al.

(10) Patent No.: US 6,751,250 B2
(45) Date of Patent: Jun. 15, 2004

(54) HIGH-DATA-RATE FREQUENCY-HOPPING WIRELESS COMMUNICATION SYSTEM

(75) Inventors: Tony Kirke, San Francisco, CA (US); Juan Grau, Redwood City, CA (US); Carlos Puig, Santa Clara, CA (US); Gitty Nasserbakht, Los Altos, CA (US)

(73) Assignee: Proxim Corporation, Sunnyvale, CA (US)

( * ) Notice: Subject to any disclaimer, the term of this patent is extended or adjusted under 35 U.S.C. 154(b) by 0 days.

(21) Appl. No.: 09/866,527

(22) Filed: May 24, 2001

(65) Prior Publication Data

US 2002/0176521 A1 Nov. 28, 2002

(Under 37 CFR 1.47)

(51) Int. Cl.[7] .............................................. H04B 1/713
(52) U.S. Cl. ...................................................... 375/133
(58) Field of Search ................................ 375/132, 133, 375/134, 135, 136, 137, 262, 265, 272, 275, 303, 334, 335, 341; 329/300

(56) References Cited

U.S. PATENT DOCUMENTS

| 5,412,687 | A | | 5/1995 | Sutton et al. ................ 375/202 |
|---|---|---|---|---|
| 5,432,814 | A | | 7/1995 | Hasegawa .................... 375/202 |
| 5,881,094 | A | | 3/1999 | Schilling ..................... 375/202 |
| 6,038,268 | A | * | 3/2000 | Kawai ......................... 375/334 |
| 6,175,860 | B1 | | 1/2001 | Gaucher ...................... 709/208 |

OTHER PUBLICATIONS

PCT Written Opinion for PCT/US02/15145 (034421–114), Dated Sep. 12, 2003.

* cited by examiner

*Primary Examiner*—Don N. Vo
(74) *Attorney, Agent, or Firm*—Thelen Reid & Priest LLP

(57) ABSTRACT

A wireless communication system including a receiver adapted to receive data at 10 Mbps or greater is described. The received signals are preferably binary (BFSK) and/or quaternary (QFSK) shift keying signals limited to a bandwidth of less than or equal to 5 MHz. The receiver includes a demodulator capable of operating in a multipath environment. In one embodiment, a frequency-hopping wireless communication system is used and the bandwidth limitations concern the bandwidth at each hop.

36 Claims, 9 Drawing Sheets

HIGH-DATA-RATE FREQUENCY-HOPPING WIRELESS COMMUNICATION SYSTEM

BACKGROUND OF THE INVENTION

The present invention generally relates to wireless communication systems, such as wireless Local Area Networks (LANs). Typically, wireless LAN systems are placed within offices or homes to allow for wireless communication with remote units. For example, hand-held computers can be wirelessly connected to other computers, printers, and the like. The present invention also relates to outdoor wireless communication systems. Outdoor wireless communication systems are used, for example, to provide connectivity between two or more physically separated independent Local Area Networks. Wireless communication systems can also provide remote access to a networking infrastructure where wired connectivity is impractical or cost-prohibitive.

In some wireless communication systems, signals from multiple paths are received. When the data rate is low, this does not cause a significant problem. However, at high data rates, the multiple paths can cause high levels of intersymbol interference (ISI).

Another issue in wireless communication systems is data rate versus bandwidth. In frequency-hopping wireless communication systems, the bandwidth available at each hop is restricted. In the U.S., FCC regulations strictly limit transmissions out of this bandwidth.

In order to get a relatively high data rate within a relatively small bandwidth, complex modulation schemes such as QAM have been used. QAM is one of a class of linear modulation techniques in which information is conveyed in the amplitude as well as the phase of the carrier. Typically these modulation schemes require linear transmitters or receivers. These modulation schemes have the disadvantage of increasing the cost of the receivers and transmitters as well as reducing the power efficiency of the transmitters. This is especially undesirable for wireless communication systems that need to use inexpensive units or are used in battery-powered devices.

A non-linear modulation technique that has been used in the past to address the need to reduce the transmission bandwidth of the signal for a given data rate is Gaussian Frequency Shift Keying (GFSK). This modulation scheme is inexpensive and has good power efficiency. In order to reduce the required bandwidth for a given data rate, the modulation index (defined as the frequency deviation used, divided by the bit rate) can be reduced to between 0.15 and 0.2. However, performance of the receiver suffers greatly at these levels. In more common implementations, the modulation index is kept at 0.5. At a 0.5 modulation index, this form of modulation is called GMSK and is widely used in cellular telephony.

Another type of system attempting to fit a higher bit rate through a fixed bandwidth are systems called partial response systems. Here, a predetermined amount of ISI is inserted into the modulation at the transmitter, and it is later corrected by the receiver. The correction does not deal with channel impairments such as multipath (which creates additional ISI) but simply with the ISI introduced by the transmitter.

Finally, techniques for dealing with channel-induced ISI have been widely used. These systems require the receiver to be a linear receiver to ensure that the integrity of the received signal is not compromised. For example, limiting receivers are a type of non-linear receiver where the amplitude information of the incoming signal is lost. However, limiting receivers are generally less expensive than linear receivers.

It is desired to have an improved wireless communication system.

SUMMARY OF THE INVENTION

The present invention is a frequency-hopping wireless communication system with a high data-rate over hop-bandwidth ratio, a relatively simple modulation scheme, and the ability to operate with the relatively high levels of intersymbol interference of a high data-rate multipath environment.

The transmitter preferably overfilters a binary or quaternary frequency shift keying (BFSK or QFSK) transmitted signal. This improves the data-rate over hop-bandwidth ratio of the QFSK transmitted signal but results in transmitter-induced intersymbol interference. In a preferred embodiment, the receiver deals with the induced intersymbol interference.

The receiver preferably uses a demodulator with a maximum likelihood sequence detector that can deal with high levels of intersymbol interference of the high data-rate multipath environment. In a preferred embodiment, the maximum likelihood sequence detector uses data from multiple symbol periods in its sequence determination. A channel impulse response estimation is preferably done to get an indication of the multipath transmissions.

One embodiment of the present invention is a frequency-hopping wireless communication system including a receiver adapted to receive data at a relatively high data rate. The received signals being quaternary frequency shift keying signals limited to a relatively low bandwidth at each frequency hop. The ratio of the data rate over the −20 dBc bandwidth of the received signal at each frequency hop is preferably greater than two Mbps/MHz. The receiver is able to operate in a multipath environment.

Another embodiment of the present invention is a frequency shift keying receiver comprising analog elements including a down-converter unit and limiter; and digital elements including a slope compensation filter, a digital gain control unit, a frequency discriminator unit and a frequency shift keying demodulator.

Yet another embodiment of the present invention is a frequency shift keying receiver comprising analog elements including a down-converter unit and a limiter; a slope compensation filter, the slope compensation filter compensating for frequency distortion induced by the analog elements; and a frequency discriminator unit after the slope compensation filter.

Another embodiment of the present invention is a receiver adapted to receive data at first and second data rates, the first data rate being associated with quaternary frequency shift keying signals, and the second data rate being associated with binary frequency shift keying signals. The binary and quaternary frequency shift keying signals having the same symbol rate. The receiver including a maximum likelihood sequence detector unit implementing trellis state diagram transition calculations in logic blocks wherein at least some of the logic blocks used to implement the binary frequency shift keying operation are also used in the quaternary frequency shift keying operation.

Still yet another embodiment of the present invention is a receiver comprising an A/D converter adapted to sample at a rate such that there are multiple samples for each transmitted symbol; a history convolver unit associated with a maximum likelihood sequence detector, the history convolver unit adapted to produce an estimate of an ideal sample value; and a sample selection unit including a timing correction unit creating early, on-time, and late error signals using early, on-time, and late samples along with the estimate of an ideal sample value. The timing correction unit using the early on-time and late error signals to determine whether to advance, retreat, or not modify the sample slot used in the demodulation.

BRIEF DESCRIPTION OF THE DRAWING FIGURES

DETAILED DESCRIPTION OF THE INVENTION

Figure 1A:
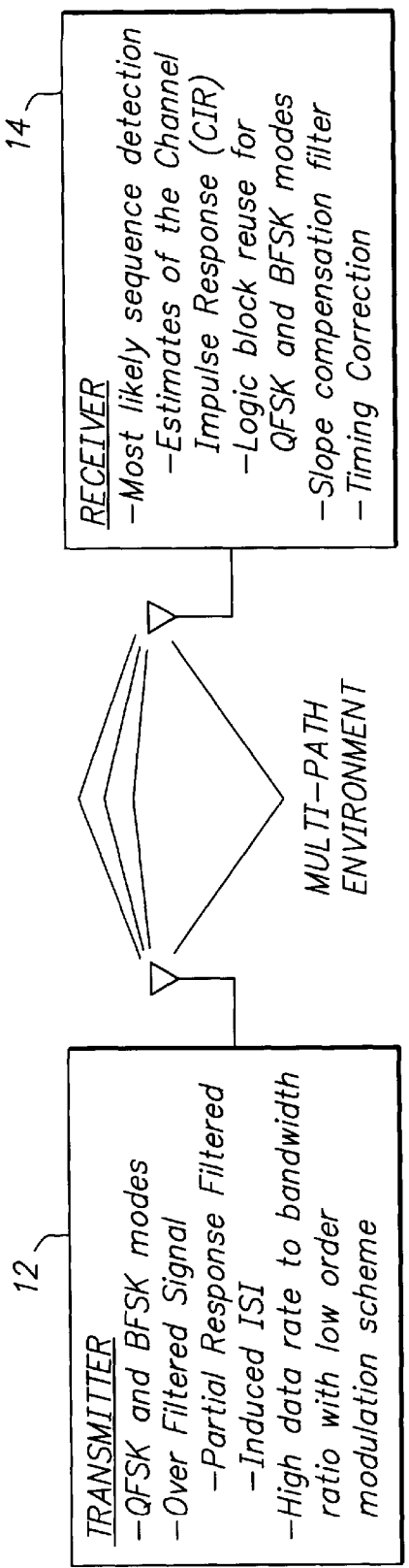
FIG. 1A is an diagram of one embodiment of the wireless communication system of the present invention.

FIG. 1A is a diagram of one embodiment of the communication system of the present invention. A transmitter 12 transmits signals through a multipath environment to receiver 14. In a preferred embodiment, the transmitter 12 sends quaternary frequency-shift keying signals and binary frequency-shift keying signals. These signals are sent at the same symbol rate; the binary frequency-shift keying signals having half the data rate of the quaternary frequency-shift keying signals. Typically the transmitter 12 will attempt to transmit the signals in the QFSK mode, but, if this transmission mode is not possible, the system will shift to the lower data rate BFSK mode. The use of relatively non-complex modulation schemes such as QFSK and BFSK in the system of the present invention reduces the complexity and cost of the receivers and transmitters.

The transmitter 12 preferably overfilters the transmitted signal. This overfiltering is often called partial response filtering. The overfiltering ensures that out-of-band emission limits at the band edges are achieved. Overfiltering also produces additional intersymbol interference. The narrow filtering of the transmitted signal in effect spreads some of the information of the transmitted signal into earlier and later symbol periods. As will be described below, a maximum likelihood sequence detector unit can be used to detect the transmitted sequence.

The transmitter 12 preferably provides a high-data-rate-to-bandwidth ratio while still using a non-complex modulation scheme. The overfiltering ensures that transmitted signal fits within the relatively narrow bandwidth of many communication schemes. The transmitter 12 and receiver 14 of the communication system preferably act as a frequency hopping spread spectrum system, which uses frequency hops determined by a pseudo-random generator at the transmitter and receiver. Despite the fact that a relatively broad spread spectrum bandwidth is used, the bandwidth at each hop is limited.

In a preferred embodiment, the data-rate-to-bandwidth (with receiver bandwidth measured at −20 dBc) ratio is one Mbps/MHz or greater. In yet a further preferred embodiment, the data-rate-to-bandwidth ratio is two Mbps/MHz or greater.

In one embodiment, the QFSK mode transmits at 10 Mbps and the BFSK mode transmits at 5 Mbps. As will be described below, at such high data rates there is a significant amount of intersymbol interference in the received signal due to the multipath environment of a wireless communication system. Another embodiment of the present invention uses a 20 Mbps transmissions at the QFSK and 10 Mbps transmissions in the BFSK mode. In this embodiment, the ISI caused by the multipath environment is even greater and thus the maximum likelihood sequence detector unit needs to interpret data in an even wider range of symbol periods in order to determine the maximum likelihood sequence transmitted. The bandwidth at each frequency hop in one preferred embodiment is 5 MHz. This bandwidth is set by the communications specification, in the U.S. by FCC regulations. The present system is not restricted to systems that use a 5 MHz bandwidth at each hop and a 10 Mbps data rate. Any specification requiring a high data-rate-to-bandwidth ratio can use the system of the present invention.

The transmitted signals follow multiple paths between the transmitter and the receiver. The multiple paths can be caused by reflections off walls and other objects. Each of the different paths will likely be of a different length and transmission time. At relatively low data rates, most of the transmitted energy of a symbol is received by the receiver in a single symbol period. At high data rates, the energy of a symbol is received by the receiver in multiple symbol periods. Transmitted energy from adjacent symbol periods mix together to cause intersymbol interference.

The receiver 14 is preferably adapted to deal with the intersymbol interference by using a maximum likelihood sequence detector unit. The receiver 14 preferably makes estimates of the channel impulse response (CIR). The channel impulse response is an indication of the received energy of a transmitted symbol within multiple adjacent receiver periods. The maximum likelihood sequence detector unit preferably operates as a Viterbi equalizer using the CIR estimate. In a preferred embodiment, logic blocks of the trellis of the Viterbi equalizer are used for both QFSK and BFSK modes.

In a preferred embodiment the receiver 14 also uses a slope compensation filter which can compensate for inadequacies of analog components of the receiver and allow inexpensive analog components to be used in the receiver. In one embodiment, the slope compensation filter also compensates for some frequency spacing non-linearities of a transmitted QFSK signal.

The receiver 14 also preferably uses a timing correction unit described below with respect to FIG. 9.

Figure 1B:
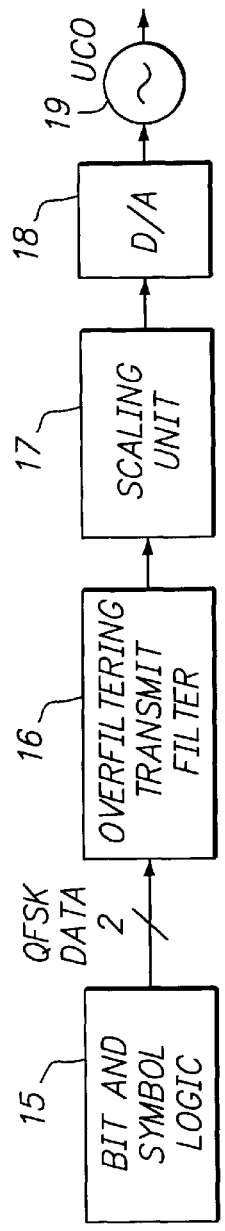
FIG. 1B is a diagram of portions of a wireless transmitter in one embodiment of a wireless communication system of the present invention.
Figure 10:
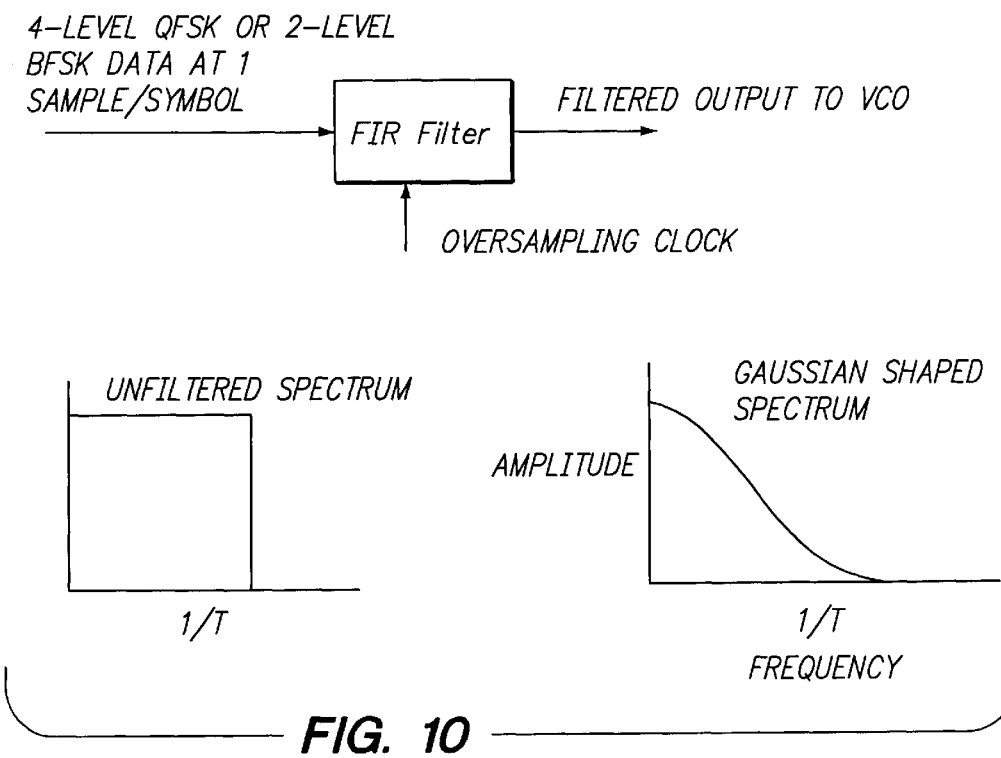
FIG. 10 is a diagram illustrating the overfiltering of the transmitted signal.

FIG. 1B shows a portion of a transmitter of one embodiment of the present invention. Block 15 is the bit and symbol logic unit which provides two bits of data for QFSK modulation and one bit of data for the BFSK modulation. An overfiltering transmit filter 16 filters the data to reduce the bandwidth of the transmitted signal. Details of an overfiltering transmit filter are described with respect to FIG. 10. The overfiltering transmit filter used with the QFSK modulation system causes the symbol data to be spread into adjacent symbol periods. The intersymbol interference is preferably removed by the receiver in the maximum likelihood sequence detector unit. The induced ISI of the overfiltering transmit filter becomes a part of the channel impulse response estimated at the receiver 14. The overfiltering transmit filter 16 is preferably a digital filter that causes the signal sent to the voltage-controlled oscillator 19 to slowly vary between the four levels used for the QFSK modulation and the two levels used for the BFSK modulation. Overfiltering a QFSK signal is not typically done because it is hard to compensate for the intersymbol interference in the receiver. The applicants have found that use of a maximum likelihood sequence detector unit allows such an overfiltering transmit filter to be used in a QFSK modulation scheme. The signals from the overfiltering transmit filter are sent to a scaling unit 17 which correctly scales the signals for conversion into frequency in the voltage-controlled oscillator 19. The digital-to-analog converter 18 converts the digital signals into an analog signal which is sent to the voltage-controlled oscillator 19. The output of the voltage-controlled oscillator 19 is later up-converted to the frequency hopping carrier frequency. FIG. 10 shows the operation of the overfiltering transmit filter 16.

Figure 1C:
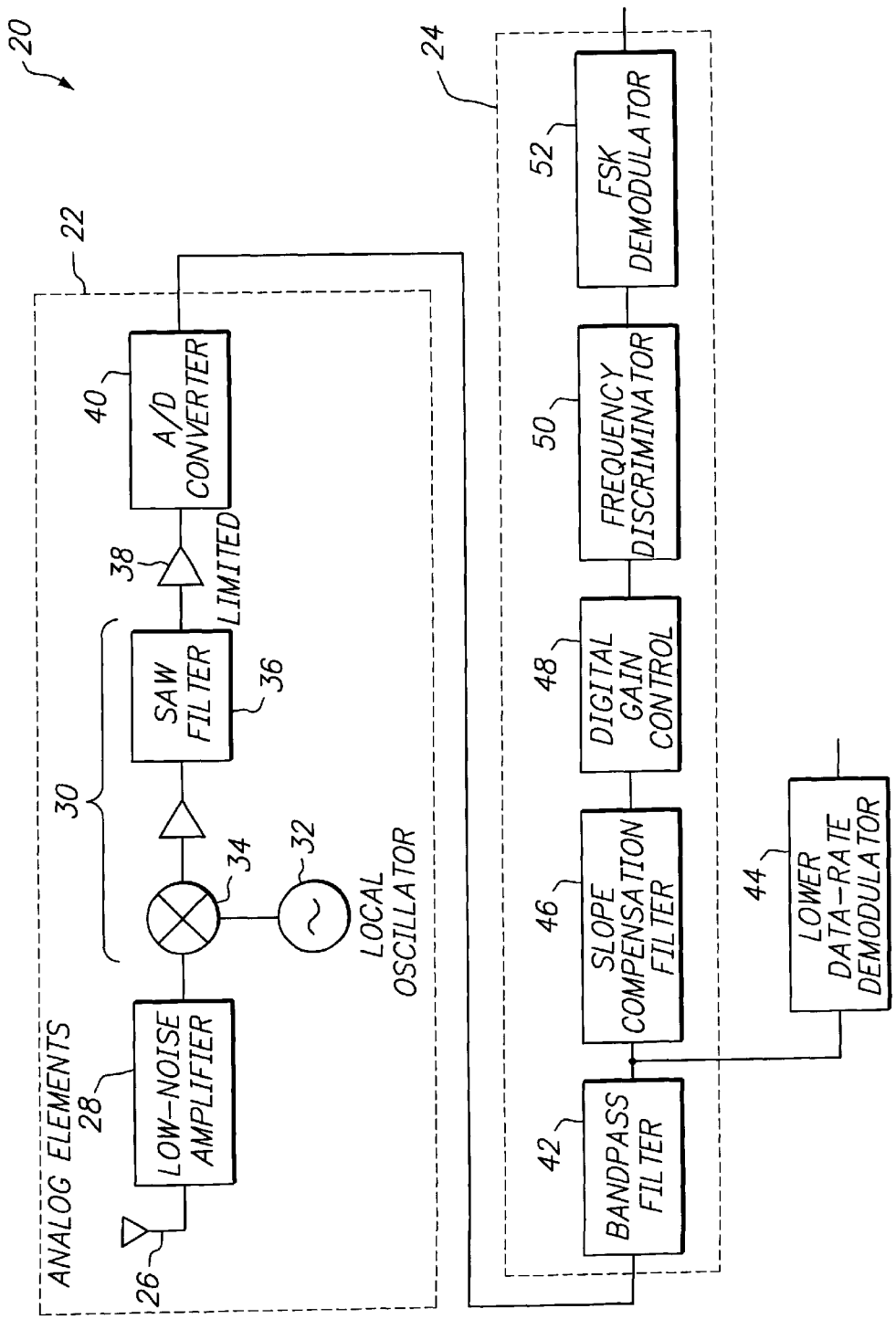
FIG. 1C is an diagram of a receiver of one embodiment of the wireless communication system of the present invention.

FIG. 1C is a diagram of one embodiment of a wireless communication system receiver 20 of one embodiment of the present invention. The receiver 20 has an analog portion 22 and a digital portion 24. The analog elements include an antenna 26, a low-noise amplifier 28, a down-converter unit 30 including a local oscillator 32, a mixer 34, and a filter 36. The filter 36 is preferably a SAW filter to deal with the down-converted signal. The output goes to a limiter 38 and to an A/D converter 40.

In one embodiment, the down-converter 30 converts a radio frequency (RF) signal into an intermediate frequency (IF) signal. In one example, an intermediate signal at 110 MHz is used. A second down-converter unit can be used to convert this intermediate frequency signal to a baseband signal. In a preferred embodiment of the present invention, however, the A/D converter 40 samples the intermediate frequency signal in such a way that the output of the A/D converter is at the baseband frequency. This has the advantage that the second down-converter unit is not needed. In order to do this sampling, the input to the A/D converter 40 is limited to a bandpass about the intermediate frequency. In one embodiment, a 110 MHz intermediate frequency signal is sampled at 40 MHz in order to produce a 10 MHz baseband output. The analog-to-digital converter 40 can be considered to act as a harmonic mixer. The A/D converter 40 takes advantage of the aliasing effect of sampling below the IF signal center frequency. The bandpass filter before the A/D converter 40 removes noise or other frequency components outside the bandpass that would interfere with the output of the A/D converter 40. Additionally, The A/D converter 40 needs to be relatively precise, since any errors introduced by the A/D converter 40 is effectively amplified by the sampling.

The digital portion 24 can be implemented in a number of ways in software or hardware. Preferably, at least part of the digital portion 24 is implemented using an application-specific integrated circuit (ASIC) to allow for good operation speed. The digital elements preferably include a bandpass filter 42. The output of the bandpass filter 42 is sent to the remainder of the high data rate demodulator elements. In one embodiment, a lower data rate demodulator 44 is also used so that receiver 20 is backward-compatible with a lower data rate systems. After the bandpass filter 42, a slope compensation filter 46 is provided. The slope compensation filter is used to compensate for amplitude or frequency distortions in the analog elements 22 such as problems with the limiter 38.

In one embodiment, the slope compensation filter also compensates for frequency distortions on the transmitter side. For example, in QFSK systems, the slope compensation filter can compensate for unequal frequency spacing. If the slope compensation filter compensates for frequency distortions on the transmitter side, in a preferred embodiment the slope compensation filter coefficients are dynamically modified in order to track the frequency distortions from the transmitter.

In one embodiment, the slope compensation filter also compensates for frequency spacing non-linearities of a transmitted QFSK signal. Demodulators for FSK signals, such as quadrature detectors or delay-line discriminators respond to both amplitude and frequency deviation. Looking at the output of the demodulator, one can not tell the difference between an error in the frequency deviation and some change in the amplitude of the signal coming in to the demodulator with respect to frequency; both give an erroneous signal. For example, when we there is uneven spacing in a QFSK signal at the output of the demodulator, we can not determine from the demodulator output, whether the transmitter actually transmitted those uneven spacings or whether the receiver made the amplitude of some of the tones larger than others because of irregularities in its receiver passband. By introducing irregularities in the receiver passband that counteract the effect of the transmitter spacing, we can actually correct for the transmitter mis-spacing.

The frequency discriminator ideally converts the frequency of an input signal into an amplitude of an output signal. The frequency shift demodulator 52 uses the amplitude shifts of the frequency discriminator 50 output to determine what frequency shift has occurred. If the local oscillator 32 drifts to provide an improper frequency shift in the output of the down-converter 30, this can result in an improper amplitude shifting in the output of the frequency discriminator 50. Additionally, if the analog elements 22 preferably amplify some frequencies more than others, the frequency discriminator 50 will convert this amplitude difference into an amplitude difference in the output, which can result in problems with the frequency shift keying demodulator. Both frequency shifts and amplitude inequalities between detected frequencies will be combined into undesirable amplitude offsets at the output of the frequency discriminator 50.

Figure 7A:
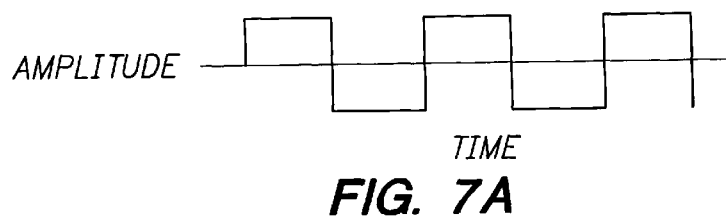
FIGS. 7A and 7B are diagrams illustrating the problem of a DC offset to the input of a frequency discriminator which can cause miscalculations in the frequency detection.
Figure 7B:
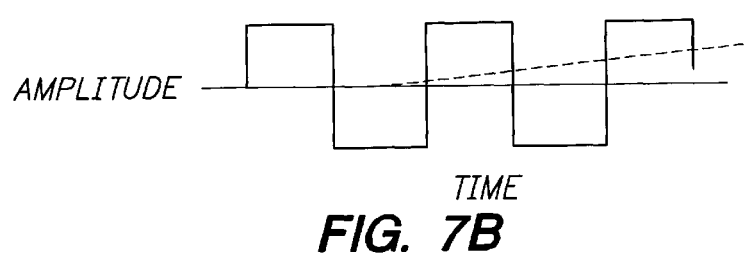

FIGS. 7A and 7B illustrate an exaggerated view of the effect of frequency drift on the output of the frequency discriminator. Note that as the frequency drifts, the amplitude of the output of the frequency discriminator is modified.

Figure 8A:
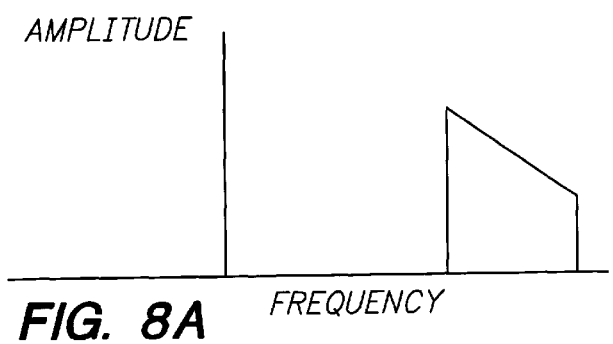
FIGS. 8A, 8B and 8C are diagrams illustrating the operation of a slope compensation filter in one embodiment of the present invention.
Figure 8B:
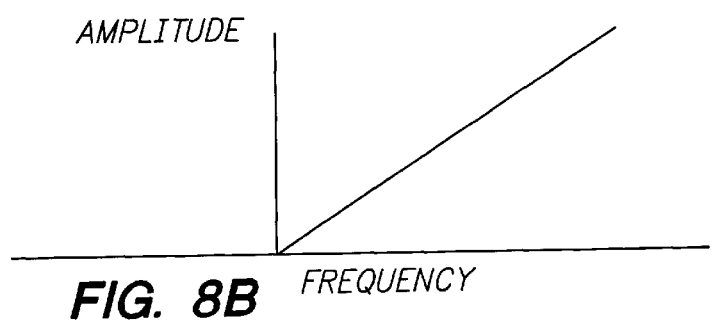
Figure 8C:
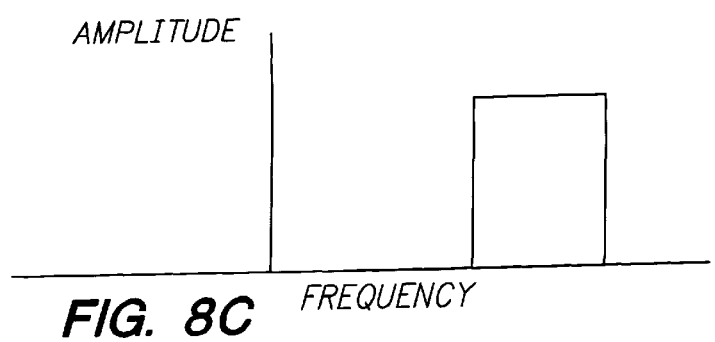

FIG. 8A illustrates the transfer function of the analog elements in the receiver versus frequency. In an ideal case, the transfer function for the analog elements would be flat for all frequencies of interest to the system. However, it is not always possible to have the analog elements be built to that precision. In particular, the limiter 38 will tend to cause a tilt in the transfer function of the analog elements. FIG. 8B illustrates one example of a compensating filter transfer function for the slope compensation filter. FIG. 8C shows the transfer function as compensated by the slope compensation filter.

The digital gain control unit 48 produces a frequency-independent gain to the signal. This is to keep the amplitudes of the signals going to the frequency discriminator 50 within a desired range. In some embodiments, the digital gain control 48 is combined with the slope compensation filter 46.

As described above, the frequency discriminator 50 converts the frequency differences of the input signal into amplitude differences of the output signal sent to the frequency shift keying demodulator 52. The frequency shift keying demodulator 52 identifies the transmitted symbols from the input amplitude shifts.

Figure 2:
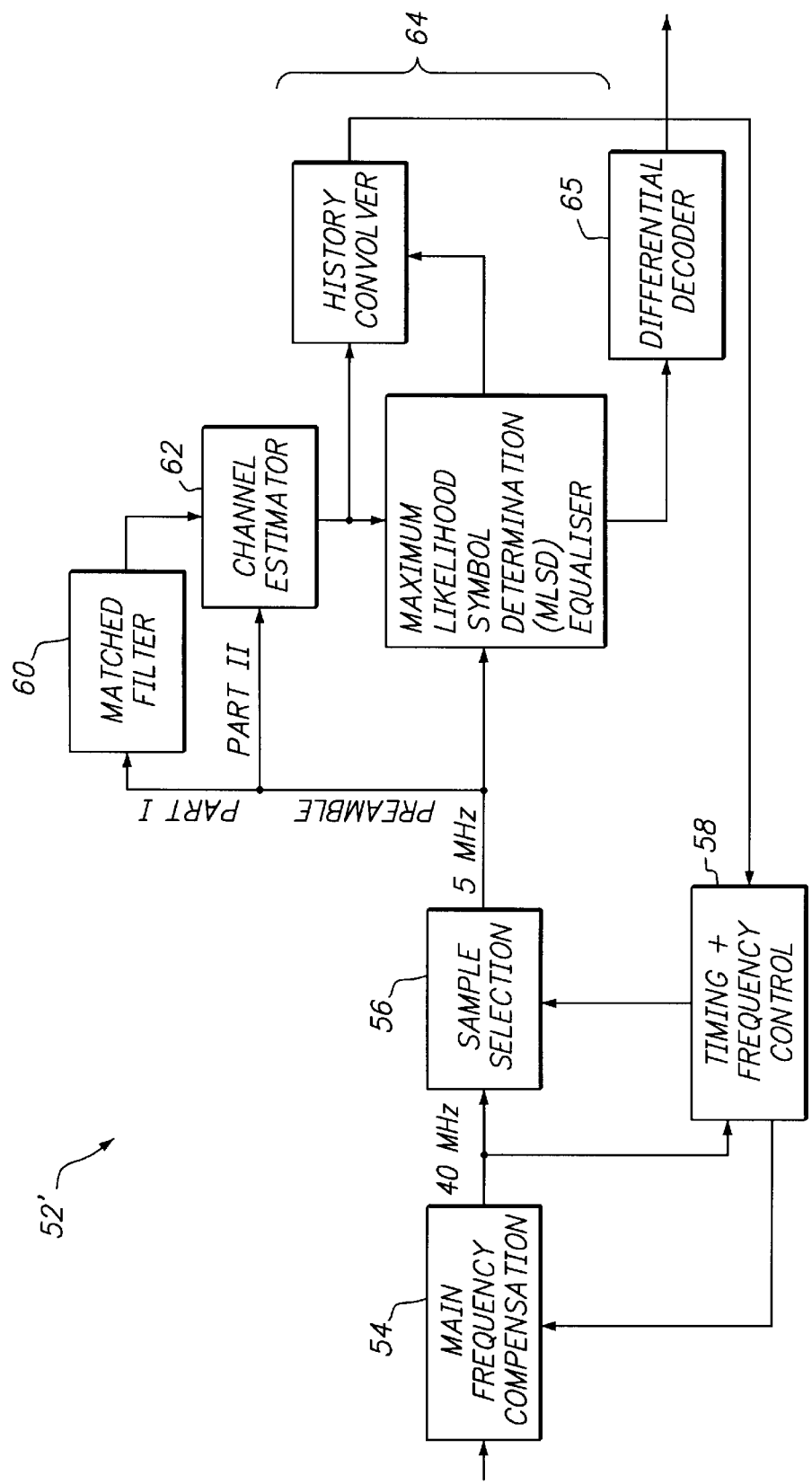
FIG. 2 is a diagram of a frequency shift keying demodulator used in one embodiment of the present invention.

FIG. 2 illustrates one embodiment of a frequency shift keying demodulator used with the present invention. The frequency shift keying demodulator 52 includes a main frequency compensation block 54. The sample selection block 56 selects one of a number of possible samples to send to the remainder of the system. In one embodiment, the sample is selected from a number of possible samples. Frequency errors are corrected during a preamble sequence of the transmitted signal. Matched filter 60 is used to give some initial indication of the channel input response (CIR), multipath time delays and amplitude attenuations for the multipath signals using the second portion of the preamble, a channel estimator 62, receiving the output of the matched filter, uses the least means square (LMS) adaptive estimation of the channel impulse response estimation. The matched filter 60 is used to provide the initial values for the taps of the channel estimator 62. This tap adaptation is done during the later part of the preamble. The CIR estimate allows the system to compensate for the overfiltering in the transmitter and the multipath transmissions. The adaptive equalizer 64 uses the channel impulse response estimation from the estimator 62 to precalculate feed-forward estimates for the data patterns of the frequency shift keying signal.

In one embodiment, a Viterbi equalizer uses a trellis to determine all the possible paths for the data. A metric is calculated for each possible path and compared with the other paths. The path with the lowest metric is determined to be the most likely, and the data corresponding to this path is stored. The number of paths or branches evaluated each symbol period is determined by the length of the channel impulse response and the size of the modulation alphabet. For binary frequency shift keying, corresponding to 5 Mbps data transmission, there are eight branches, while for QFSK, corresponding to 10 Mbps transmissions, there are 64 branches. At each symbol period there are corresponding beginning and ending states associated with these branches. With the branch corresponding to the current symbol and the previous state corresponding to the two preceding symbols. The number of states is four by BFSK and for sixteen for QFSK. The metric for each branch is determined by the sum of a branch metric and the corresponding previous state metric of the originating state. For each state, the new metrics for all the branches into that state are calculated and compared. The lowest metric and the data corresponding to that branch are attained. Thus for binary frequency shift keying (BFSK), two branches are compared, while for quaternary frequency shift keying (QFSK), four branches are compared for each state. The branch metric is calculated as the square of the difference between the input sample and the convolution of the corresponding possible data pattern with the estimated three-tap channel impulse response. Assuming that the channel impulse response is constant throughout the burst, these convolutions can be calculated once during the training period to reduce the critical timing path in the Viterbi equalizer, and reduce the power consumption. For binary frequency shift keying, there are sixteen corresponding convolutions, while for quaternary frequency shift keying, there are sixty-four. Note that if a greater data rate such as 20 Mbps for QFSK or 10 Mbps for BFSK is used, the number of symbol periods of the CIR estimate and the size of the Viterbi trellis are expanded.

Figure 3A:
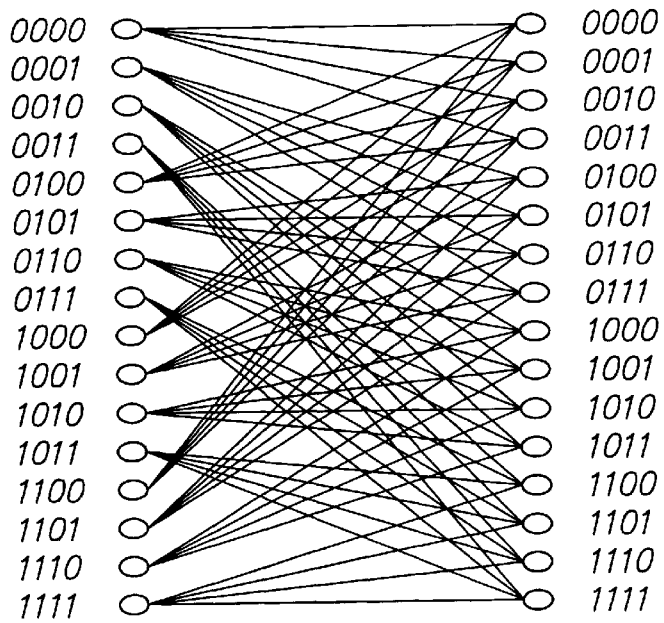
FIG. 3A is a diagram showing a state transition diagram used with the QFSK transmissions in one embodiment of the present invention
Figure 3B:
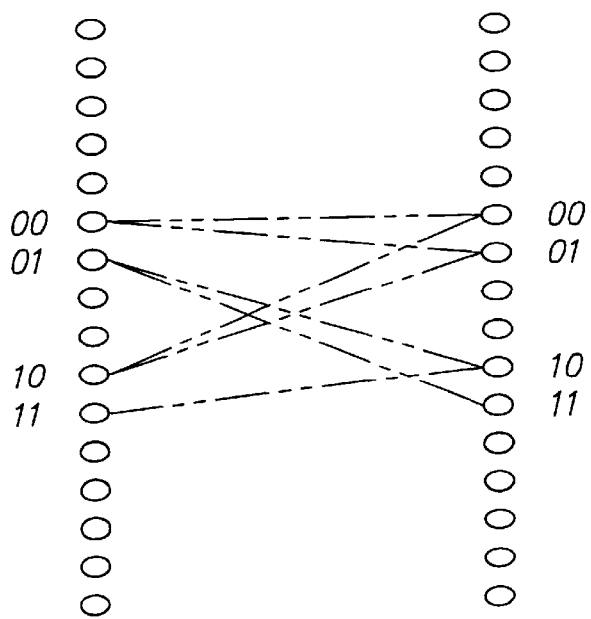
FIG. 3B is a reduced state transition diagram used for the BFSK transmissions in one embodiment of the present invention.
Figure 4:
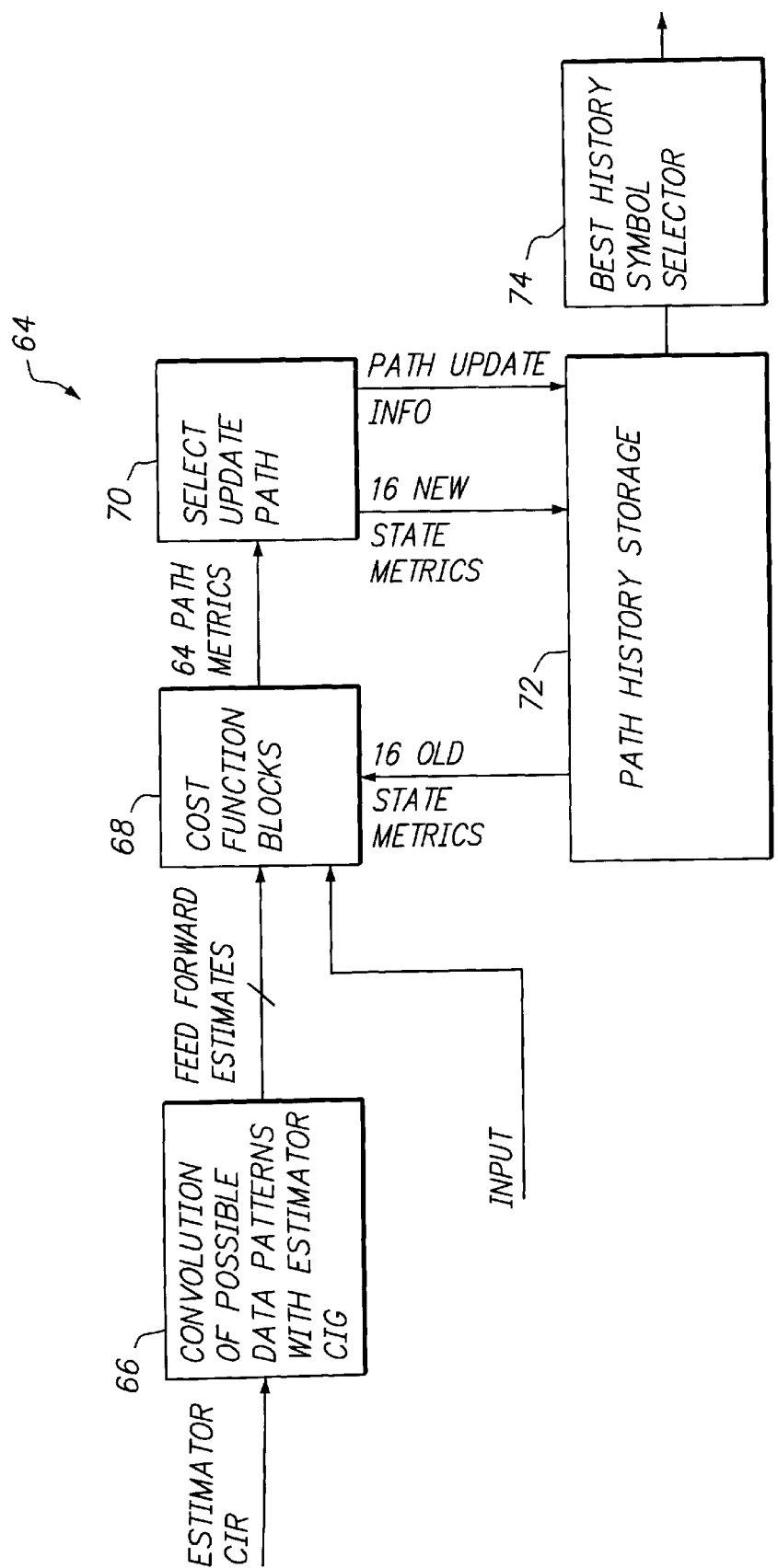
FIG. 4 is a diagram illustrating the maximum likelihood symbol detection equalizer of one embodiment of the present invention.

FIGS. 3A and 3B show Viterbi state diagrams used with the QFSK and BFSK, correspondingly. Note that the similar state transitions for the BFSK can be used so that during the BFSK, some of the Viterbi units can be turned off to allow reduced power consumption. FIG. 4 illustrates the example of one embodiment of a Viterbi equalizer 64. The decoder 52 also includes a differential decoder 65. The differential decoder compares the current symbol to the prior symbol to produce the desired output.

FIG. 4 illustrates one embodiment of a Viterbi equalizer 64. In block 66, a compilation of the possible data patterns with the estimated channel impulse response is done. As discussed above, this convolution is done once every burst period to minimize power consumption. Cost function blocks determine the branch metrics. As described above for binary frequency shift keying, a subset of the cost function blocks used for the quaternary shift keying are used, and some of the other logic blocks used for quaternary shift keying can be turned off to conserve power. The cost function blocks have as input the feed-forward estimate, the input from block 66 and the old state metrics. The updating path selection block 70 selects from the sixty-four possible path metrics the sixteen new state path metrics and the path update information which is stored in the path history storage 72. The best history symbol selector 74 selects the best history from the corresponding lowest state path metric to give a determination of the transmitted symbol.

Figure 5:
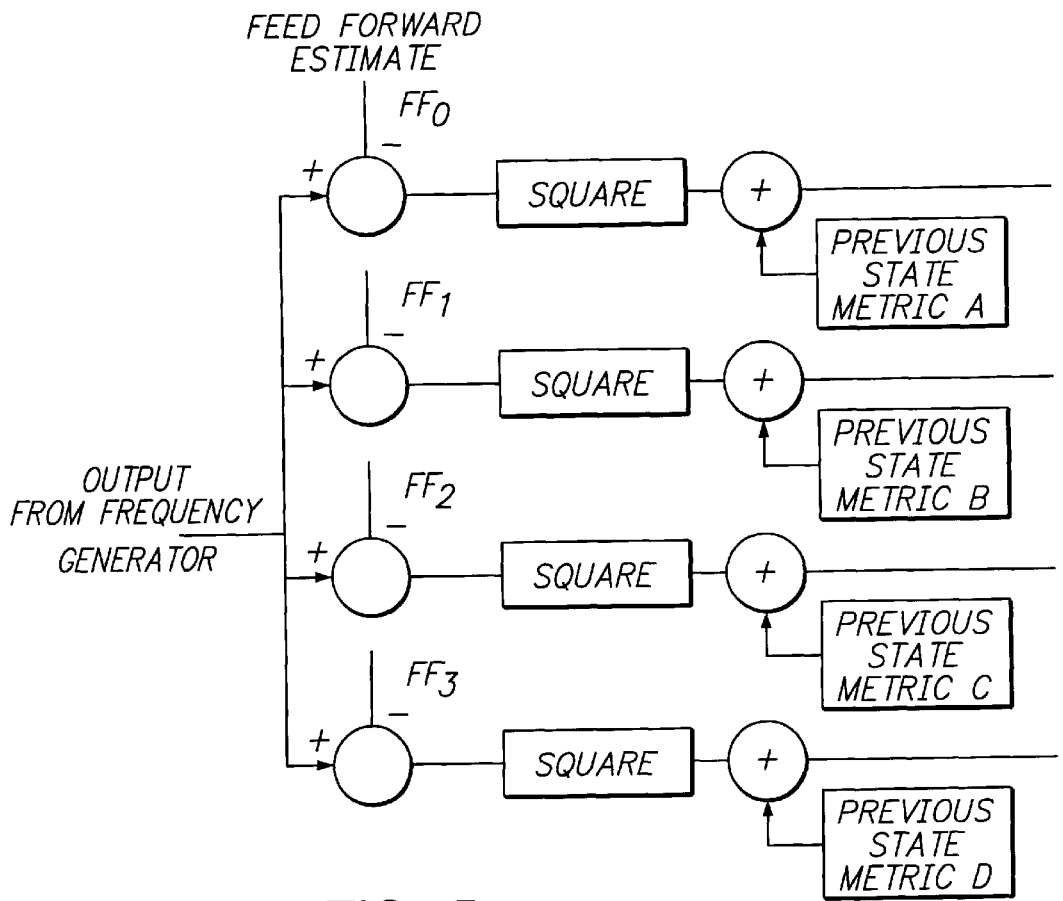
FIG. 5 is a diagram illustrating some of the elements in a cost function block of the system of FIG. 4.

FIG. 5 illustrates some of the cost function blocks elements shown in FIG. 4. The input signal is subtracted from the feed-forward estimate. This result is then squared and then added to the appropriate previous state metric. As discussed above, for the QFSK, there are sixteen states, each having four possible transition branches. After these new possible state metrics are calculated, they are compared so that only the best state metric for each particular state is stored. For BFSK, there are four possible states, each having two possible transition branches. Thus, for the QFSK there are sixteen path state metrics to keep track of, and sixty-four new path metrics to be calculated.

During the BFSK, a number of the same blocks can be used. Other blocks can be turned off to save power. Additionally, the preferred embodiment, the cost function blocks are reused in different clock cycles. Thus, in one embodiment, sixteen cost function blocks are time-shared four times during a symbol period during the operation, so that less than sixty-four total cost function blocks are required in the ASIC.

Figure 6:
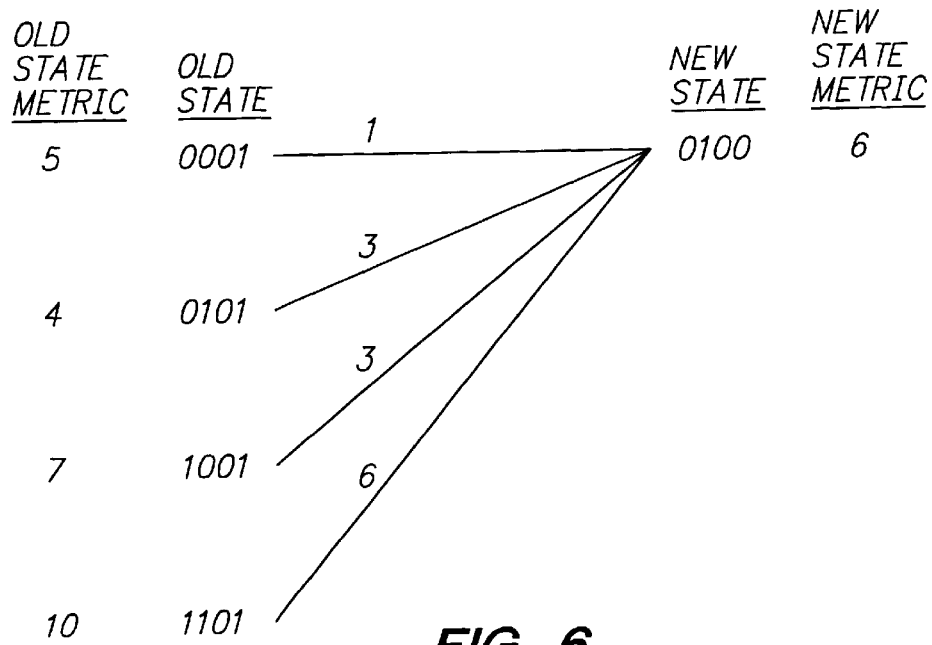
FIG. 6 is a diagram illustrating the operation of the cost function blocks of the Viterbi most likelihood symbol detector.

FIG. 6 shows an illustration of how a state metric is shown. In this example, four paths going to state 0100 are shown. Each path has a calculated metric value which is added to the old state path metric to produce new state metrics. In this example, the path from state 0001 to state 0100 has the lowest combined metric which is considered as the new state metric.

Figure 9:
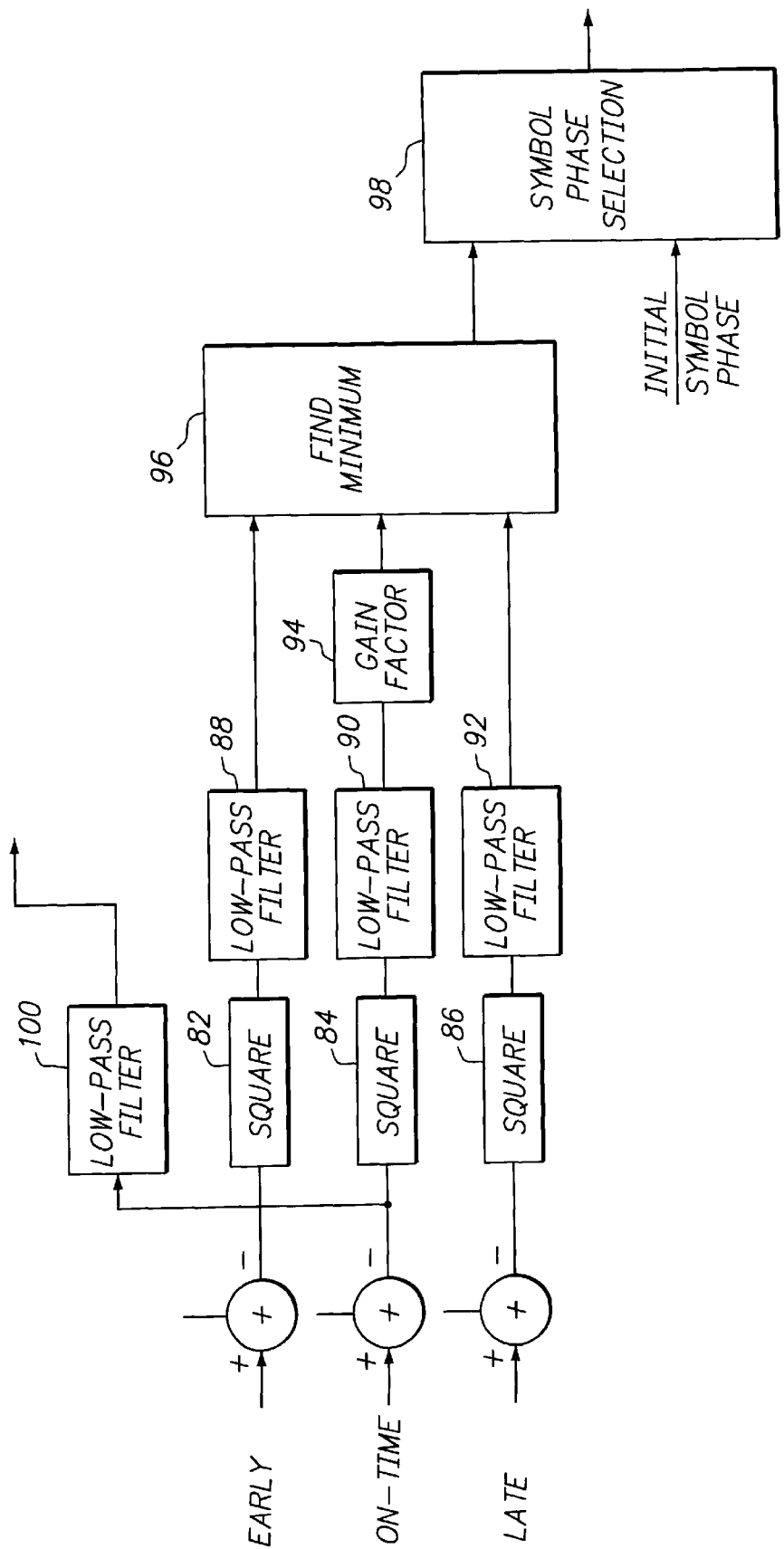
FIG. 9 is a diagram illustrating the operation of the timing correction logic used in one embodiment of the present invention.

FIG. 9 illustrates one example of a timing correction element. In this example, early, on-time and late phase signals are created. The sampling is done at 40 MHz in one embodiment, and only data sampled at 5 MHz is sent to the rest of the system. The selection of one out of the eight sample periods to use is done as follows: The on-time sample is the sample slot currently being used. The early sample is a 40 MHz clock sample before the on-time sample slot. The late sample is a 40 MHz clock sample after the on-time sample slot. The early, on-time and late samples are subtracted from an estimated value. This estimated value preferably comes from the convolution of the estimated channel impulse response and the delayed tentative decisions from the Viterbi equalizer. These early, on-time, and late error values are sent to a square function element boxes 82, 84, 86. These squared error functions are then sent through a low-pass filters 88, 90, 92. The on-time value 90 is multiplied by a gain value block 94. In a preferred embodiment, the gain value is greater than one to cause a quick trigger of the switching of the timing. Block 96, which operates at a lower sample rate, finds the minimum value which is then used in the single phase selection block 98 to modify the initial symbol phase. The low-pass filter 100 is used to provide a frequency correction signal.

A description of one embodiment of this system is given below. Preferably both the BFSK and QFSK signals have a transmitted symbol rate of 5 MHz. The BFSK transmissions, preferably have a peak-to-peak frequency deviation of 1400 KHz minimum, 1550 KHz nominal and 1750 KHz maximum. This corresponds to a peak frequency deviation of 700 Khz minimum, 775 KHz nominal and 875 KHz maximum. Thus, for a BFSK, one symbol corresponds to about +0.8 MHz from the carrier frequency; another symbol corresponds to about −0.8 MHz from the carrier frequency. For the QFSK signals, the peak-to-peak frequency deviation is 1800 KHz minimum, 2000 KHz nominal and 2250 KHz maximum. The peak frequency deviation is 900 KHz minimum, 1000 KHz nominal and 1125 KHz maximum. For the QFSK case, four different symbols need to be transmitted within the 2 MHz nominal peak-to-peak deviation. Each of the symbols are preferably separated by 666 KHz in order to maintain a constant frequency separation between the four transmitted symbols.

For the transmitter filtering for both BFSK and QFSK, the symbol rate remains 5 Khz. The BT is an indication of the ratio of the transmitter filtering bandwidth over the symbol rate. The premodulation filter bandwidth at −3 dB in the transmitter is set at 2.50 MHz nominal, which results in a BT of 0.5 for a 5 MHz symbol rate. The BT value can be reduced to 0.35 or 0.30 in an overfiltering operation, as described above. The use of the most likely sequence detector in the receiver allows such a low BT ratio. For the QGSK case, transmitted signal have no "eye" at such low BTs . In one embodiment, the transmitted filtering is required to have a BT of around 0.5 plus or minus twenty percent.

It will be appreciated by those of ordinary skill in the art that the invention can be implemented in other specific forms without departing from the spirit or character thereof. Note that other receiver and transmitter designs can be used with the system of the present invention. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A frequency-hopping wireless communication system including a receiver adapted to receive data at a relatively high data rate, the received signals being binary (BFSK) and/or quaternary (QFSK) frequency shift keying signals limited to a relatively low bandwidth at each frequency hop, the ratio of the data rate to the receiver bandwidth at each frequency hop being greater than one Mbps/MHz in the case of binary frequency shift keying and greater than two Mbps/MHz in the case of quaternary frequency shift keying, the receiver including a demodulator able to operate in a multipath environment.

2. The frequency-hopping wireless communications system of claim 1 wherein the received signals are BFSK signals.

3. The frequency-hopping wireless communication system of claim 1 wherein the received signals are QFSK signals.

4. The frequency-hopping wireless communication system of claim 1 wherein the received signals include BFSK and QFSK signals.

5. The frequency-hopping wireless communication system of claim 1 wherein the relatively low bandwidth at each frequency hop is ensured by over filtering the transmittal signal.

6. The frequency-hopping wireless communication system of claim 1 wherein the demodulator includes a maximum likelihood sequence detector.

7. The frequency-hopping wireless communication system of claim 6 wherein the maximum likelihood sequence detector unit is a Viterbi equalizer.

8. The frequency-hopping wireless communication system of claim 6 wherein the maximum likelihood sequence detector unit uses an estimate of the channel impulse response.

9. The frequency-hopping wireless communication system of claim 6 wherein the maximum likelihood sequence detector unit removes intersymbol interference in the transmitted signal.

10. The frequency-hopping wireless communication system of claim 9 wherein the intersymbol interference in the received signal is a result of a multi-path environment.

11. The frequency-hopping wireless communication system of claim 9 wherein the intersymbol interference in the received signal is a result of over filtering the received signal.

12. The frequency-hopping wireless communication system of claim 6 including an application-specific integrated circuit which implements the detection of both binary and quaternary frequency shift keying signals in the maximum likelihood sequence detector unit.

13. The frequency-hopping wireless communication system of claim 1 wherein the receiver includes a slope compensation filter, the slope compensation filter compensating for induced frequency distortion in analog elements of the receiver.

14. The frequency-hopping wireless communication system receiver of claim 1 wherein the receiver includes an analog-to-digital converter adapted to sample at a rate such that there are multiple samples for each transmitted symbol, and a sample-selection unit including a timing correction unit creating early, on-time and late error signals using early, on-time and late samples along with an estimate of the ideal sample value, and using the early, on-time and late error signals to determine whether to advance, retreat, or not modify the sample slot used in the demodulation.

15. The frequency-hopping wireless communication system receiver of claim 14 wherein the estimate of the ideal sample value is generated by a convolution of the estimated channel impulse response and delayed tentative decision of the Viterbi equalizer.

16. The frequency-hopping wireless communication system receiver of claim 1 wherein the receiver is adapted to receive data at 10 Mbps or greater.

17. The frequency-hopping wireless communication system receiver of claim 16 wherein the received signals are limited to a bandwidth of less than or equal to 5 MHz at each frequency hop.

18. The frequency-hopping wireless communication system receiver of claim 1 wherein the received signals are limited to a bandwidth of less than or equal to 5 MHz at each frequency hop.

19. A frequency shift keying receiver comprising:
analog elements including a down-converter unit and limiter; and
digital elements including a slope compensation filter, a digital gain control unit, a frequency discriminator unit and a frequency shift keying demodulator,
wherein the receiver is adapted to receive data at a relatively high data rate, the received signals being binary (BFSK) and quaternary (QFSK) frequency shift keying signals limited to a relatively low bandwidth at each frequency hop, the ratio of the data rate over the bandwidth at each frequency hop being greater than one Mbps/MHz for BFSK signals and greater than two Mbps/MHz for QFSK signals.

20. The frequency shift keying receiver of claim 19 wherein the digital elements include a bandpass filter.

21. The frequency shift keying receiver of claim 19 wherein the slope compensation filter compensates for induced frequency distortion in the analog elements.

22. A frequency shift keying receiver comprising:
analog elements including a down-converter unit and a limiter;
a slope compensation filter, the slope compensation filter compensating for frequency distortion induced by the analog elements; and
a frequency discriminator unit after the slope compensation filter,
wherein the receiver is adapted to receive data at a relatively high data rate, the received signals being binary (BFSK) or quaternary (QFSK) frequency shift keying signals limited to a relatively low bandwidth at each frequency hop, the ratio of the data rate over the bandwidth at each frequency hop being greater than one Mbps/MHz for binary (BFSK) frequency shift keying signals or greater than two Mbps/MHz for quaternary (QFSK) frequency shift keying signals.

23. The frequency shift keying receiver of claim 22 wherein the slope compensation filter further compensates for nonlinearities in the received signal.

24. The frequency shift keying receiver of claim 22 wherein the slope compensation filter further compensates for unequal frequency spacing in the received signal.

25. The frequency shift keying receiver of claim 24 wherein the received signal is a quaternary frequency shift keying signal.

26. The frequency shift keying receiver of claim 24 wherein the received signals include both binary frequency shift keying signals and quaternary frequency shift keying signals.

27. The frequency shift keying receiver of claim 22 further comprising a frequency shift keying demodulator.

28. A receiver adapted to receive data at first and second data rates, the first data rate being associated with quaternary frequency shift keying signals, the second data rate being associated with binary frequency shift keying signals, the binary and quaternary frequency shift keying signals having the same symbol rate, the receiver including a maximum likelihood sequence detector unit implementing trellis state diagram transition calculations in logic blocks wherein at least some of the logic blocks used to implement the binary frequency shift keying operation are also used in the quaternary frequency shift keying operation.

29. The receiver of claim 28 wherein the quaternary frequency shift keying operation also uses additional logic blocks which are turned off during the binary frequency shift keying operation.

30. The receiver of claim 29 wherein the quaternary frequency shift keying signal is a 10 Mbps signal and wherein the binary frequency shift keying signal is a 5 Mbps signal.

31. The receiver of claim 28 wherein the trellis state diagram calculation box is implemented on an application-specific integrated circuit.

32. A receiver comprising:
an A/D converter adapted to sample at a rate such that there are multiple samples for each transmitted symbol;
a history convolver unit associated with a maximum likelihood sequence detector, the history convolver unit adapted to produce an estimate of an ideal sample value; and
a sample selection unit including a timing correction unit creating early, on-time, and late error signals using early, on-time, and late samples along with the estimate of an ideal sample value and using the early on-time and late error signals to determine whether to advance, retreat, or not modify the sample slot used in the demodulation.

33. The receiver of claim 32 wherein the sample selection unit includes a gain element to increase the on-time error signal sent to a minimum detector in order to speed the transition to an early or late sample phase.

34. The receiver of claim 32 wherein the sample selection unit is part of a frequency shift keying demodulator unit.

35. A frequency shift keying receiver comprising:
analog elements including a down-converter unit and limiter; and
digital elements including a slope compensation filter, a digital gain control unit, a frequency discriminator unit and a frequency shift keying demodulator,
wherein the frequency shift keying demodulator includes a maximum likelihood sequence detector unit that implements a trellis state diagram calculations and logic blocks wherein the logic blocks used to implement a slower rate operation are also used in the faster rate operation and wherein the faster data rate operation also uses logic blocks which are turned off at the slower data rate to save power.

36. A frequency shift keying receiver comprising:
analog elements including a down-converter unit and limiter;
digital elements including a slope compensation filter, a digital gain control unit, a frequency discriminator unit and a frequency shift keying demodulator; and an A/D converter adapted to sample at a rate such that there are multiple samples for each transmitted symbol and wherein the frequency shift keying demodulator includes a sample selection unit including a timing correction unit creating early, on-time and late error signals using early, on-time and late samples along with an estimate of an ideal sample value, and using the early, on-time and late error signals to determine whether to advance, retreat, or not modify the sample slot used in the demodulation.

* * * * *